United States Patent [19]
Towns

[11] Patent Number: 5,941,403
[45] Date of Patent: *Aug. 24, 1999

[54] CLOSURE AND METHOD OF MAKING SAME

[76] Inventor: Edward J. Towns, 2310 Appian La., Monroe, N.C. 28110

[ * ] Notice: Under 35 U.S.C. 154(b), the term of this patent shall be extended for 77 days.

[21] Appl. No.: 08/555,836

[22] Filed: Nov. 13, 1995

[51] Int. Cl.[6] .................................................. B65D 39/00

[52] U.S. Cl. ......................................................... 215/252

[58] Field of Search ............................................. 215/252

[56] References Cited

U.S. PATENT DOCUMENTS

| | | | |
|---|---|---|---|
| 4,147,268 | 4/1979 | Patel et al. | 215/252 |
| 4,697,714 | 10/1987 | Towns et al. | 215/252 |
| 4,936,474 | 6/1990 | Szczesniak et al. | 215/252 |
| 5,131,550 | 7/1992 | Thompson | 215/252 |
| 5,356,020 | 10/1994 | Thompson | 215/252 |

*Primary Examiner*—Stephen K. Cronin
*Attorney, Agent, or Firm*—Charles E. Temko

[57] ABSTRACT

A threaded closure for use with containers for liquid contents of a type including a severable tamper-indicating ring in which provision is incorporated to facilitate removal of the closure from an injection mold while minimizing the possibility of damage to parts of relatively thin cross section.

3 Claims, 1 Drawing Sheet

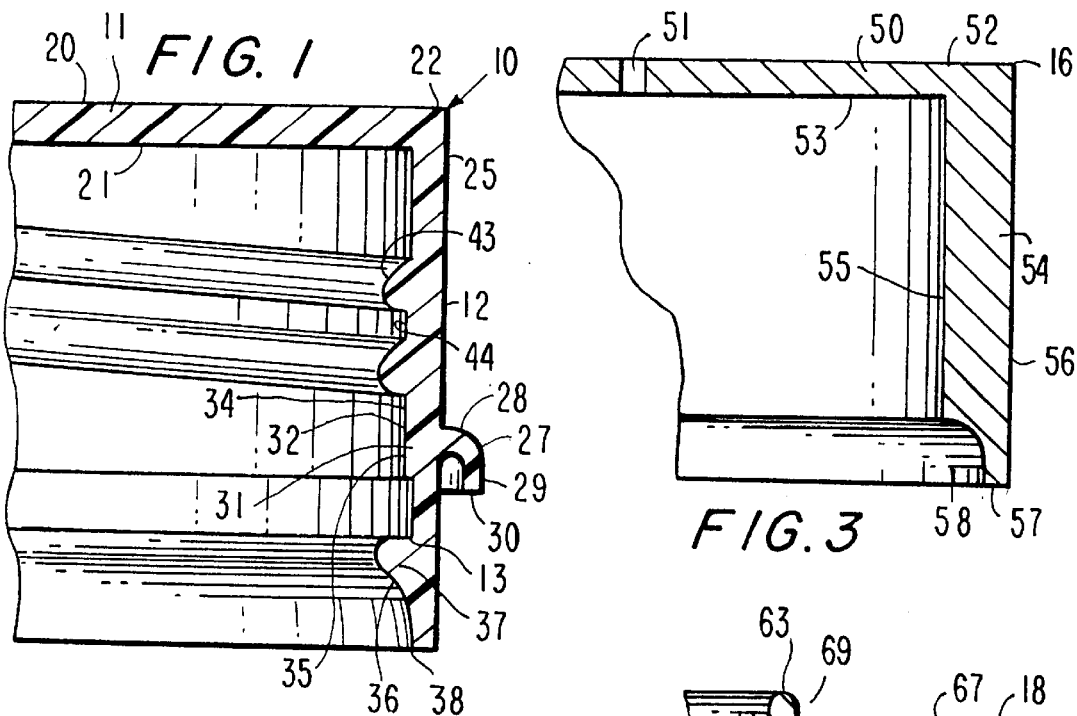
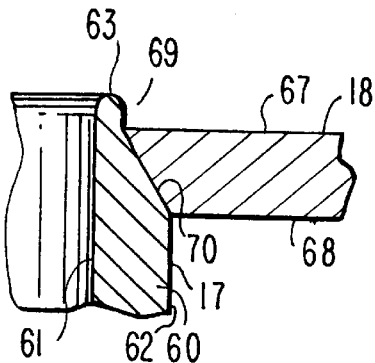
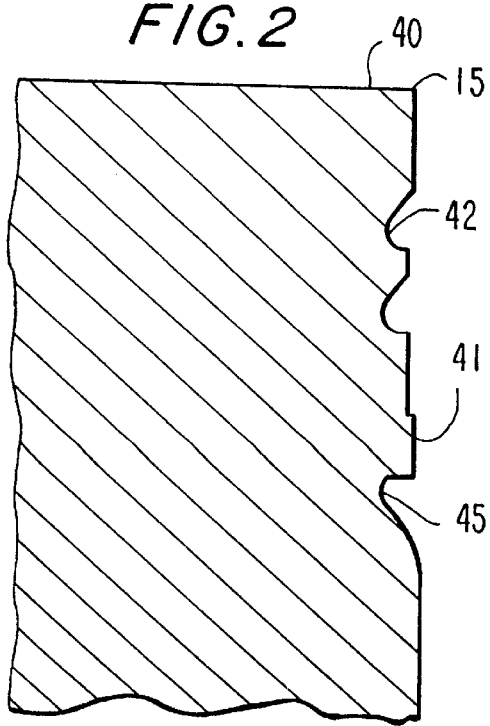
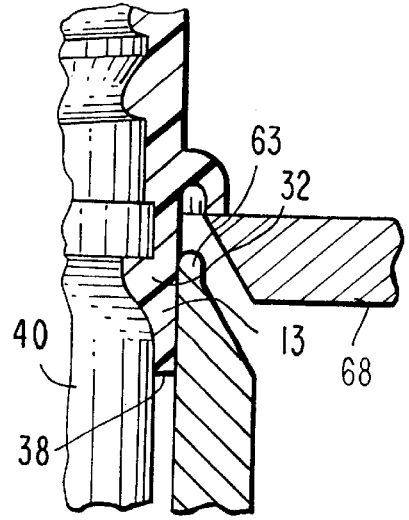

5,941,403

1

CLOSURE AND METHOD OF MAKING SAME

BACKGROUND OF THE INVENTION

This invention relates generally to the field of synthetic resinous closures for containers of liquid beverages and the like under pressurized condition; and more particularly to an improved threaded closure incorporating a tamper-indicating ring which is severed from the remaining parts of the closure when the closure is first unthreaded from the container.

In recent years, this type of closure has been in increased commercial acceptance for use with synthetic resinous or glass containers, as contrasted with single use aluminum cans and the like, to replace the unthreaded crown type closure which cannot be used to reseal the container once it has been removed. However, the fact that the container may be resealed gives rise to the necessity of providing tamper-indicating means to assure the user of the integrity of the contents of the container.

Closures of this type have been manufactured using injection molding techniques in a variety of synthetic resinous material, typically, polyterephthalate (PET). More recently, particularly where the internal pressures of the container are not excessive, the closures are formed from relatively softer and less dense materials such as polyethylene. This material is somewhat easier to mold, and because of greater flexibility, the closure usually does not require a separate seam gasket on the inner surface of the end wall.

However, these advantages are not without accompanying complication. The material comprising the tamper-indicating ring is normally of relatively thin cross section, and during removal of the formed closure from the mold, it must be radially expanded to clear the thread-forming proclivities on the male part of the molding cavity. The closure is removed using an orificed ejection or stripping plate which engages the lower edge of the tamper-indicating ring, or other annularly projecting portion of the closure over at least a part of its inner surface to expand the closure to clear the projections on the outer surface of the male part of the mold. When using the above-mentioned softer synthetic resinous materials, the tamper-indicating ring which is frangibly interconnected to the body of the closure is often either separated or ruptured during this operation. It is normally not a problem when using materials of greater strength or density.

SUMMARY OF THE INVENTION

Briefly stated, the invention contemplates the provision of an improved closure of the type described in which provision is made for the radial expansion of the tamper-indicating ring during removal from the male portion of the mold without exerting force on the tamper-indicating ring while yet enabling the inner surface thereof to clear proclivities on the outer surface of the male portion of the mold. This is accomplished by molding a radially projecting annular bead on the outer surface of the body of closure which is formed by separate members on the female part of the mold which bead incorporates a surface for engaging the stripper plate, as well as providing space for the required expansion. The effective diameter of the orifice in the stripper plate is, accordingly, slightly larger than normal to provide a continuation of such plate below the bead.

BRIEF DESCRIPTION OF THE DRAWINGS

In the drawings, to which reference will be made in the specification, similar reference characters have been employed to designate corresponding parts throughout the several views.

FIG. 1 is a vertical central sectional view of a closure in accordance with the present invention.

FIG. 2 is a fragmentary vertical sectional view of a male element forming part of a molding cavity for the forming of the embodiment shown in FIG. 1.

FIG. 3 is a fragmentary vertical sectional view of an upper female mold element.

FIG. 4 is a fragmentary vertical sectional view of a lower female mold element with stripper plate engaged.

FIG. 5 is a vertical sectional view showing the action of the stripper plate in removing a molded closure from the male element of the mold cavity.

DETAILED DESCRIPTION OF THE DISCLOSED EMBODIMENT

In accordance with the invention, FIG. 1 discloses a closure 10 embodying the present invention. It includes an end wall 11, a cylindrical side wall 12, and a frangibly interconnected tamper-indicating ring 13 of configuration generally known in the art. The closure is formed with using mold elements illustrated in FIGS. 2, 3, and 4, including a male mold element 15, an upper female mold element 16, and a lower female mold element 17 used in conjunction with a stripper plate 18 which serves to remove the closure 10 from the male mold element 15 at the completion of a molding operation.

The end wall 11 is bounded by an outer surface 20 and an inner surface 21 and is bordered by a circular edge 22. The side wall 12 is bounded by an outer cylindrical surface 25 which may be knurled for convenience in opening. An annular bead 27 extends radially outwardly from the surface 26 adjacent the lower edge thereof, the bead 27 being bounded by an upper surface 28, an outer surface 29, and a lower surface 30 which forms an annular recess 31 adjacent an inner edge thereof. Frangible bridges 32 interconnect the tamper-indicating ring 13 as known in the art. The ring 13 includes an upper edge 34, and an inner surface 35 forming a tapered annular bead 36, as well as an outer surface 37 which meets the inner surface 35 at a lower edge 38.

Referring to FIG. 2, the male mold element 15 is generally conventional, and is bounded by an upper planar surface 40, and a cylindrical surface 41 including a spiral thread forming recess 42 which forms threads 43 on the inner surface 44 of the cylindrical wall 12. The outer surface also includes a shaped recess 45 which forms the inner surface of the tamper-indicating ring 13.

Referring to FIG. 3, the upper female mold element 16 is generally conventional, and includes an upper wall 50 which may include an injection gate 51. The wall 50 is bounded by an upper surface 52 and a lower surface 53, and is formed integrally with a cylindrical side wall 54 having an inner surface 55, an outer surface 56 and a lower mating surface 57 which includes an arcuate recess 58 which forms the upper and outer surface 28-29 of the bead 27.

The lower female mold element 17 (FIG. 4) includes a cylindrical wall 60 having an inner surface 61, an outer surface 62, and an annular projection 63 which forms the annular recess 31. They operate in conjunction with the stripper plate 18 in known manner, the plate 18 including an upper surface 67, lower surface 68, and a conical surface 69 which mates with a corresponding conical surface 70 in an area between upper and lower surfaces 71 and 72.

The molding procedure is substantially similar to that known in the art, wherein the mold structure is closed and a quantity of moldable material is injected between the male and female mold members and allowed to polymerize. Removal of the molded closure is accomplished by first raising the upper female mold element 16 which exposes the upper part of the closure and the upper part of the male mold element 15. Next, the male element is raised a short distance sufficient to remove it from contact with the inner surface 61 of the lower mold element, following which the stripper plate 18 is raised to urge the now molded closure 10 from the male mold element. In the prior art, the stripper plate normally engages the lower edge 38 of the tamper-indicating ring 13, there being a frusto-conical surface which engages the inner surface of the tamper-indicating ring and spreads it slightly as the plate moves the closure from the male mold element. In the present embodiment, where the cap and particularly the tamper-indicating ring are made of less dense materials, this form of closure removal is not possible without excessively stressing the tamper-indicating ring with possible rupture. By contrast, in the present embodiment, the closure is not engaged by the stripper plate at the tamper-indicating ring, but rather, at the lower surface 30 of the bead 27 outwardly of the recess 31. This engagement permits the maintenance of a clearance space inwardly of the orifice in the stripper plate, so that the tamper-indicating ring may radially expand into the space without damage upon clearing proclivities on the outer surface of the male mold element. These may be the edges of the thread-forming recess 32, or the recess 45. The presence of the annular recess 31 longitudinally enlarges this space in the area of the frangible bridges interconnecting the tamper-indicating ring with the lower edge of the side wall 12.

I wish it to be understood that I do not consider the invention to be limited to the precise details of structure shown and set forth in the specification, for obvious modifications will occur to those skilled in the art to which the invention pertains.

I claim:

1. In a molded threaded closure of a type including a planar end wall, an internally threaded cylindrical side wall having an outer cylindrical surface, and a tamper-indicating ring frangibly attached to a lower edge of said side wall, said tamper-indicating ring having a radially inwardly projecting bead on an inner cylindrical surface thereof, the improvement comprising: said outer cylindrical surface of said side wall having a radially outwardly extending bead thereon, said bead including an outer surface and a lower surface, said lower surface including an annular groove therein, said groove being positioned adjacent an upper edge of said tamper-indicating ring, said groove providing space for radial expansion of said tamper-indicating ring during removal of said closure from a male mold element after a molding operation.

2. The improvement defined in claim 1, said closure being formed of polyethylene.

3. The improvement defined in claim 1, in which said lower surface of said bead on said cylindrical wall is positioned radially outwardly of said groove.

\* \* \* \* \*